Aug. 11, 1931.  C. V. CONRAD  1,818,791
RIM
Filed Oct. 29, 1930   2 Sheets-Sheet 1
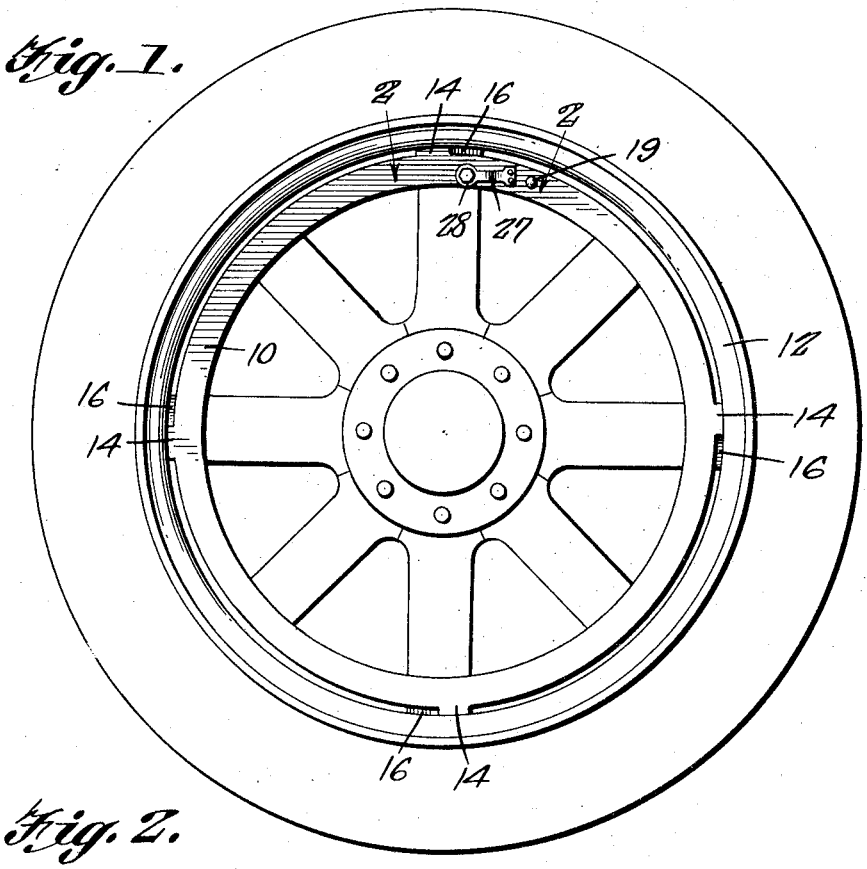
Fig. 1.
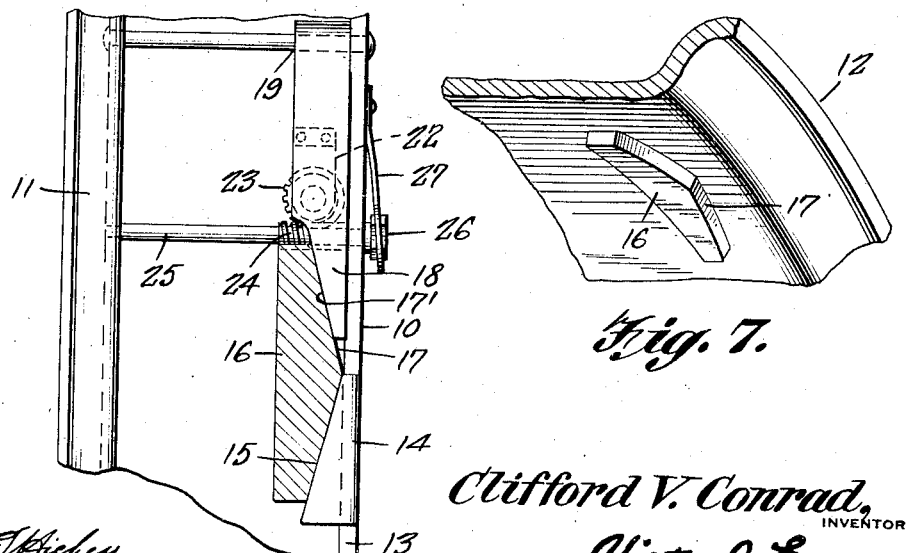
Fig. 2.
Fig. 7.
Clifford V. Conrad,
INVENTOR
BY Victor J. Evans
ATTORNEY
WITNESS:

Aug. 11, 1931.　　　C. V. CONRAD　　　1,818,791
RIM
Filed Oct. 29, 1930　　　2 Sheets-Sheet 2
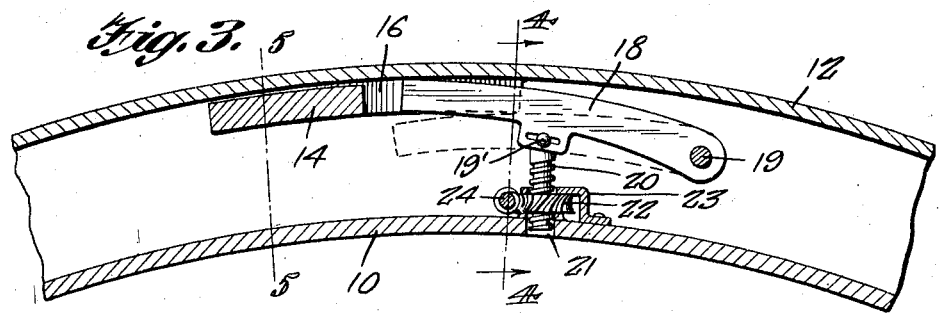
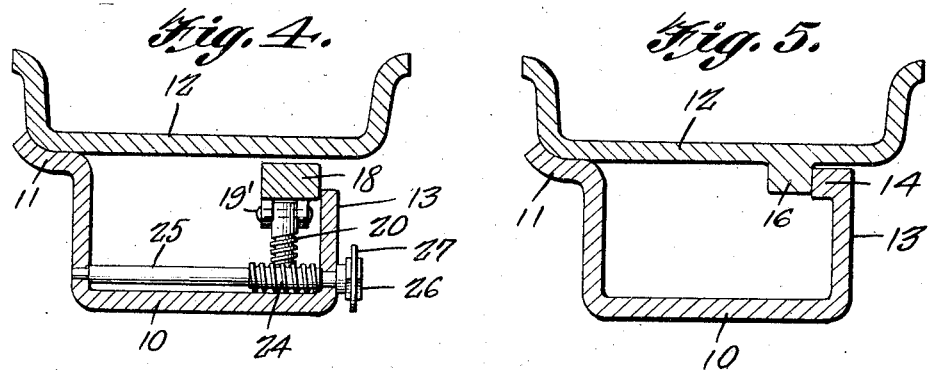 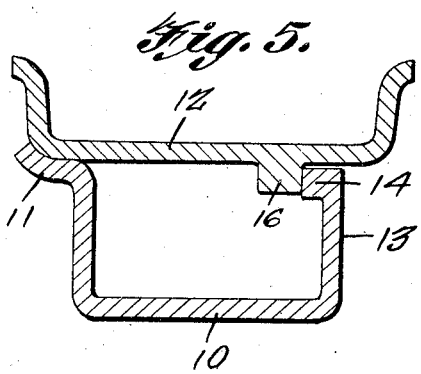
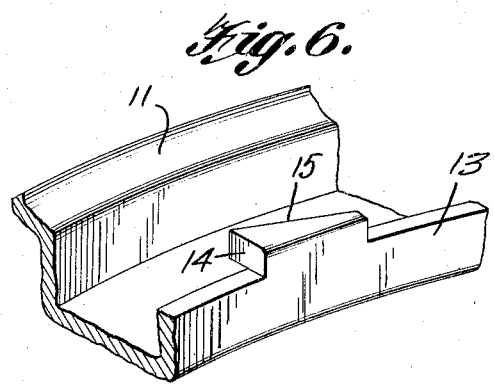
Clifford V. Conrad,
INVENTOR
BY Victor J. Evans
ATTORNEY Patented Aug. 11, 1931

1,818,791

UNITED STATES PATENT OFFICE

CLIFFORD V. CONRAD, OF PORTLAND, OREGON, ASSIGNOR OF ONE-HALF TO MIKE DITCHEN, OF PORTLAND, OREGON

RIM

Application filed October 29, 1930. Serial No. 492,041.

This invention relates to demountable rims for automobile wheels and has for an object the provision of a rim which may be easily and quickly secured to and removed from the wheel without the use of the usual detachable rim lugs, or other detachable parts likely to become loose or misplaced when changing a tire.

Another object of the invention is the provision of means for locking the rim upon and removing the same from a wheel through the operation of a single controlling member, so that the change of tire may be effected in a relatively short time and with a minimum amount of labor, the construction and manner of engagement of the parts acting to hold the rim against creeping and thus prevent rim squeak and other objectionable noises.

With the above and other objects in view, the invention further includes the following novel features and details of construction, to be hereinafter more fully described, illustrated in the acompanying drawings and pointed out in the appended claim.

In the drawings:—

Figure 1 is a side elevation of a vehicle wheel equipped with the invention.

Figure 2 is an enlarged fragmentary sectional view on the line 2—2 of Figure 1.

Figure 3 is a fragmentary vertical section taken circumferentially of the wheel.

Figures 4 and 5 are sections taken respectively on the lines 4—4 and 5—5 of Figure 3.

Figure 6 is a fragmentary perspective view showing a portion of the felly.

Figure 7 is a like view showing a portion of the rim.

Referring to the drawings in detail wherein like characters of reference denote corresponding parts, the reference character 10 indicates a felly of a vehicle wheel, the felly being of the hollow metal type, although a wooden felly may be used if desired.

The felly 10 is provided along one edge with a flange 11, which provides a seat for a demountable rim 12, while the opposite side of the felly is provided with a flange 13 from which extends circumferentially spaced lugs 14. These lugs extend inward and their inner edges are inclined or beveled as shown at 15 so as to provide substantially wedge-shaped lugs which are adapted to be engaged by lugs 16 spaced around the inner surface of the rim 12.

The lugs 16 are reversely beveled or inclined as shown at 17, and one of these inclined edges is adapted to engage the inclined edges 15 of the lugs 14, while the other inclined edges of the lugs 16 are adapted to be engaged by an inclined portion 17' provided at one end of a dog 18. The other end of this dog is pivotally mounted as shown at 19 and is adapted to be moved pivotally so as to bring the inclined free edge of the dog into and out of engagement between one of the lugs 16 and the adjacent portion of the flange 13 of the felly.

In order to move the dog pivotally, the latter has pivotally secured thereto as shown at 19', one end of a threaded stud 20. The opposite end of this stud is positioned within an opening 21 or other bearing and has threadedly mounted thereon a worm gear 22. The gear is held against movement longitudinally of the stud by means of a bracket 23 and is engaged by a worm 24 which is mounted upon a worm shaft 25, the latter being positioned transversely of the felly 10. An angular shaped head 26 is carried at the outer end of the shaft 25 and provides means whereby the shaft may be rotated to move the dog pivotally into and out of locking position, as previously described.

In order to prevent accidental rotation of the dog 25 and thus hold the parts against accidental movement, a spring tongue 27 has one end secured to the felly 10, and the opposite end of this tongue is provided with an opening 28 which is shaped to conform to the shape of the member 26 and may be disengaged from said member to permit operation of the shaft 25.

Normally, the tongue 27 engages the member 26 to hold the parts against movement, but by disengaging the tongue and rotating the shaft by means of a wrench or other suitable tool, the dog may be moved inward to release the rim, whereupon the latter may be moved circumferentially and disengaged from the felly. In order to secure the rim in place, the operation is reversed.

The invention is susceptible of various changes in its form, proportions and minor details of construction and the right is herein reserved to make such changes as properly fall within the scope of the appended claim.

Having described the invention what is claimed is:—

In a demountable rim, a felly having a circumferential flange, wedge-shaped lugs carried thereby, a rim adapted to be removably mounted upon the felly, lugs carried by the rim and having reversely inclined faces opposed to the felly flange and adapted to have one of said faces engage the felly lugs, a pivotally mounted locking dog carried by the felly, an inclined portion at the free end of the dog for engagement between an inclined face of one of the rim carried lugs and the flange of the felly to hold the rim in position, means to move the dog pivotally, and means to hold the dog moving means against operation.

In testimony whereof I affix my signature.

CLIFFORD V. CONRAD.